INVENTOR
EARL R. PRICE

INVENTOR
EARL R. PRICE
BY

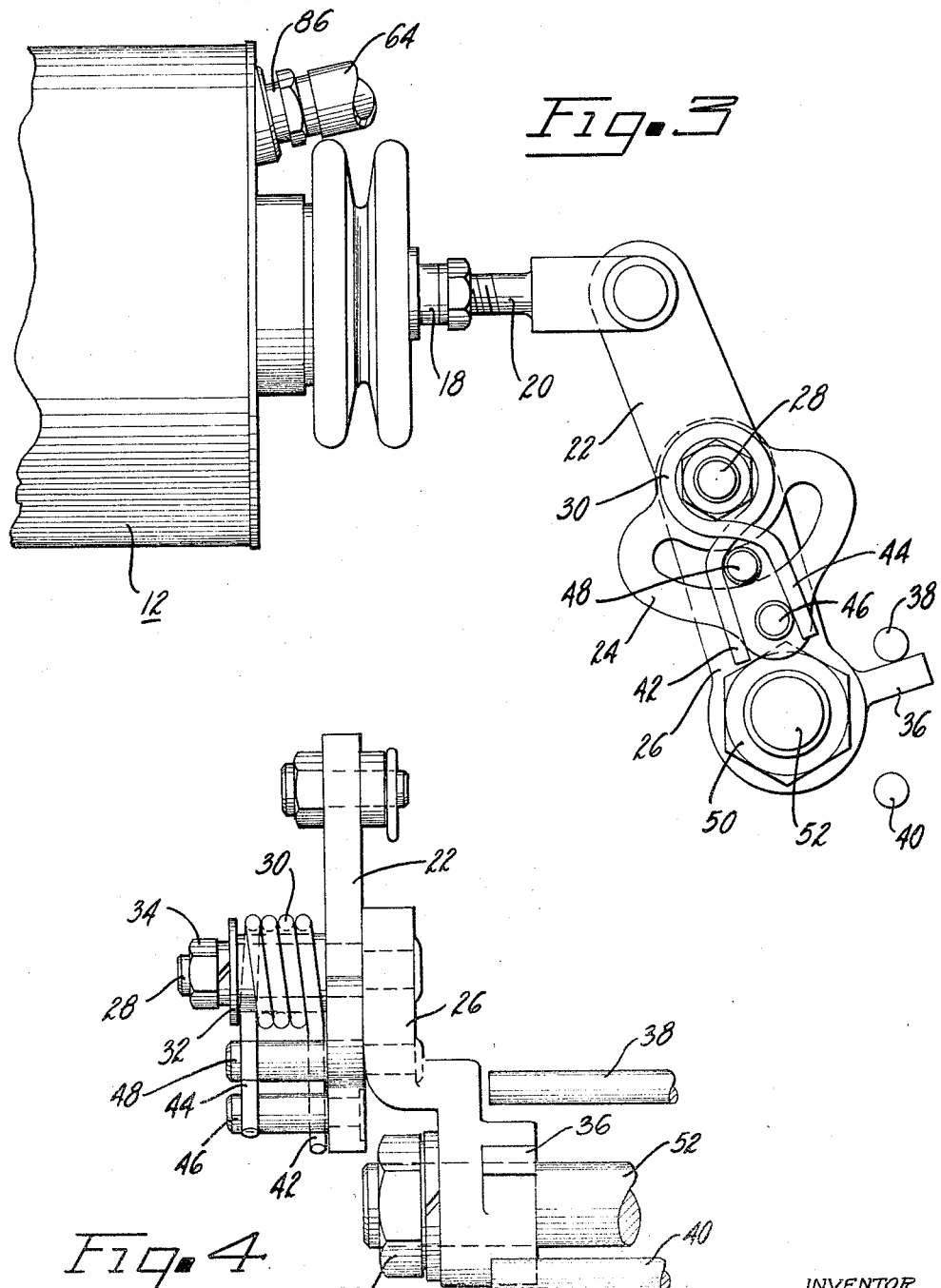

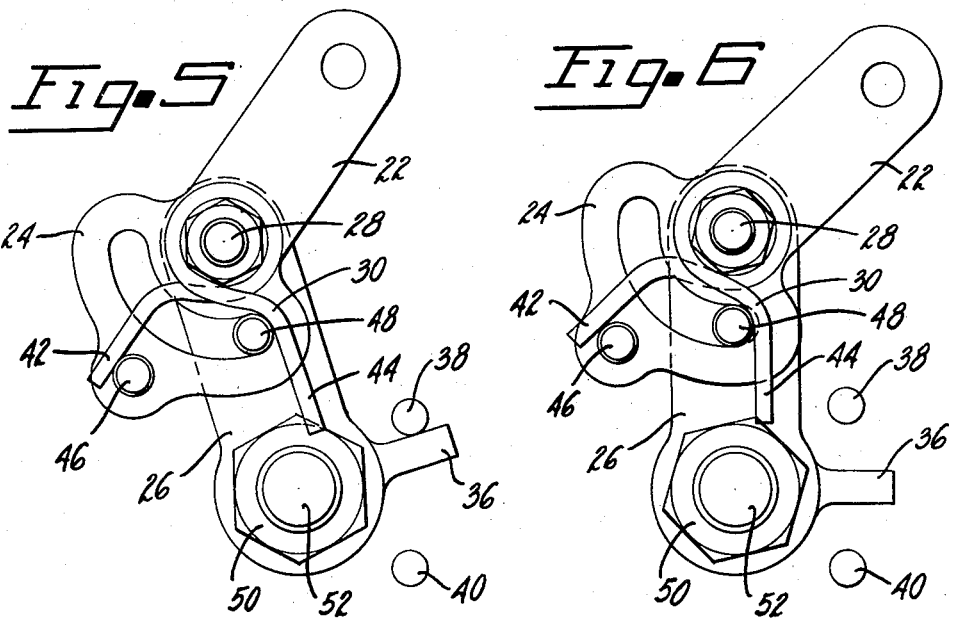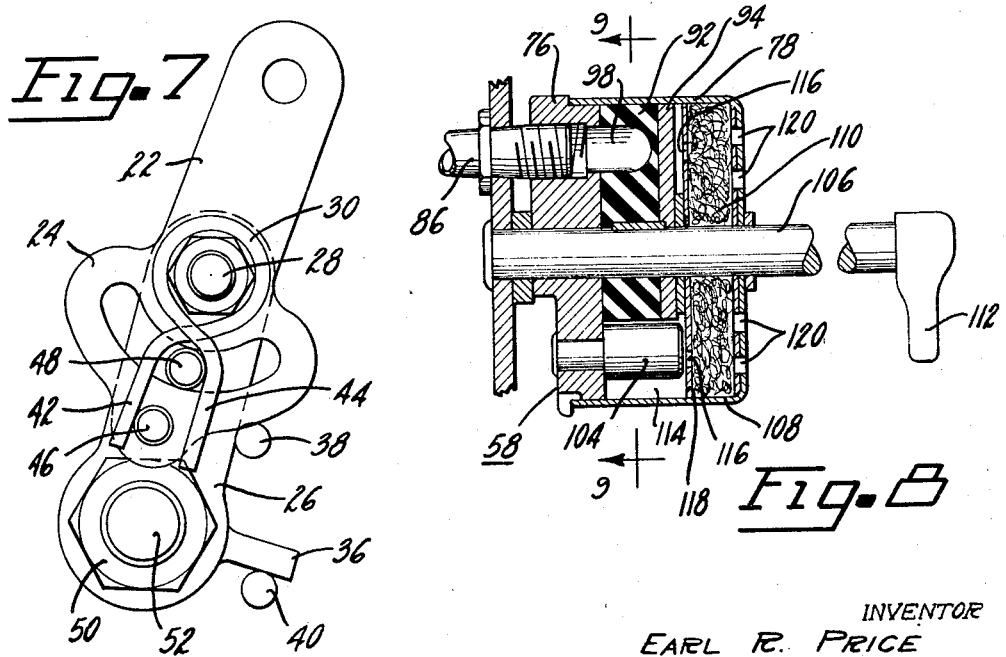

June 18, 1946.   E. R. PRICE   2,402,343
TRANSMISSION OPERATING MECHANISM
Filed Dec. 20, 1943   5 Sheets-Sheet 5

INVENTOR
EARL R. PRICE
BY H. O. Clayton

Patented June 18, 1946

2,402,343

UNITED STATES PATENT OFFICE 2,402,343

TRANSMISSION OPERATING MECHANISM

Earl R. Price, South Bend, Ind., assignor to Bendix Aviation Corporation, South Bend, Ind., a corporation of Delaware Application December 20, 1943, Serial No. 514,937

2 Claims. (Cl. 74—346)

This invention relates in general to gear shifting mechanism and is of particular utility when employed in connection with speed-changing and direction-reversing gearing commonly used in coupling the internal combustion engine of an automotive vehicle or a tank with the driving vehicle wheels or other propelling devices.

One object of my invention is to provide power means for operating a two-speed transmission gear mechanism said mechanism being operably associated with a differential mechanism of standard construction and mounted adjacent thereto in the power plant of the vehicle. In other words, it is an object of my invention to provide power means for operating the so-called two-speed axle mechanism of the day.

Yet another object of my invention is to provide power means for operating a two-speed axle said power means being controlled by an operation of the accelerator and an operation of a manually operated selector valve.

A further object of my invention is to provide power means for operating a two-speed axle mechanism said power means including a spring and vacuum operated double-acting motor the operation of which is controlled by the operation of a manually operated so-called four-way or double three-way selector valve and the operation of the accelerator of the vehicle in its control of the speed of the engine and the degree of gaseous pressure within the intake manifold of said engine.

One of the important features of my invention is to provide a double-acting pressure differential operated motor for establishing a change speed transmission in one or the other of two settings said motor being connected with said transmission by means including a so-called double-acting yieldable means which is energized, that is cocked, during the first half of the gear shifting movement of the power element of said motor and is then operative, after said power element has completed its gear shifting movement to neutralize the transmission, to establish the transmission in gear.

Yet another object of my invention is to provide power means for operating the so-called two-speed axle of an automotive vehicle said power means including a double-acting vacuum motor comprising a casing member detachably secured to the casing of the two-speed axle and further comprising a power element operably connected to a shift fork of the axle mechanism. The force transmitting means interconnecting the shift fork and power element includes a so- called double-acting yieldable means which is of such a strength that the same is collapsed, that is cocked, when the vacuum motor is energized to effect an operation of the axle mechanism said operation being effected prior to a neutralization of the axle mechanism which is effected during the last part of the movement of the power element of said motor, the cocked yieldable means then functioning, after the gears of the axle mechanism to be meshed are brought to synchronous speeds by controlling the speed of the engine of the vehicle, to expand thereby effecting a new setting of the axle mechanism. There is thus provided what may be termed a three-stage force transmitting means that is means having three distinct stages of operation in effecting the disengagement and reengagement of the transmission mechanism.

Other objects of the invention and desirable details of construction will become apparent from the detailed description of certain embodiments of the invention described in the specification to follow and disclosed in the accompanying drawings in which:

Figure 3 is a view disclosing a portion of the pressure differential operated motor of that embodiment of my invention disclosed in Figure 1 together with the double-acting yieldable means interconnecting said motor with the transmission mechanism to be operated;

Figure 4 is a side view of the double-acting torsion spring constituting the aforementioned yieldable means, said spring being shown in combination with two crank members;

Figure 10:
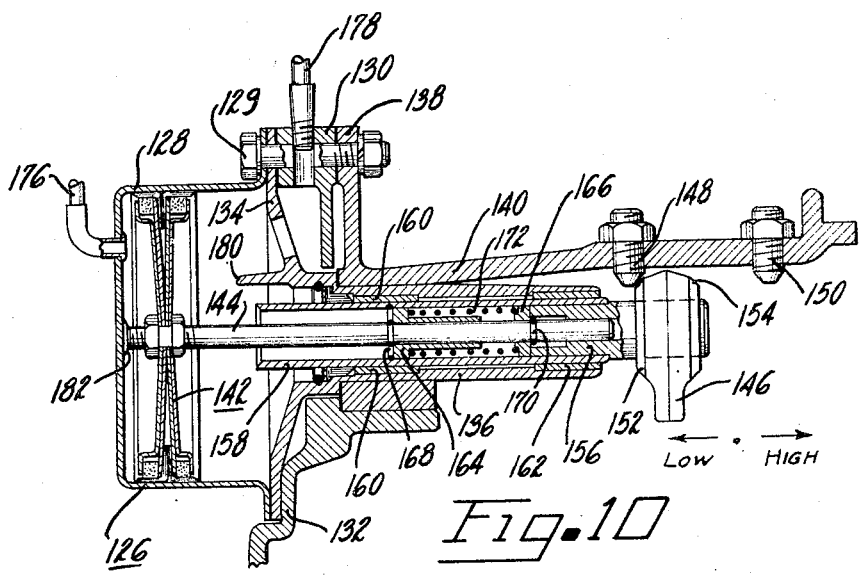
Figure 9:
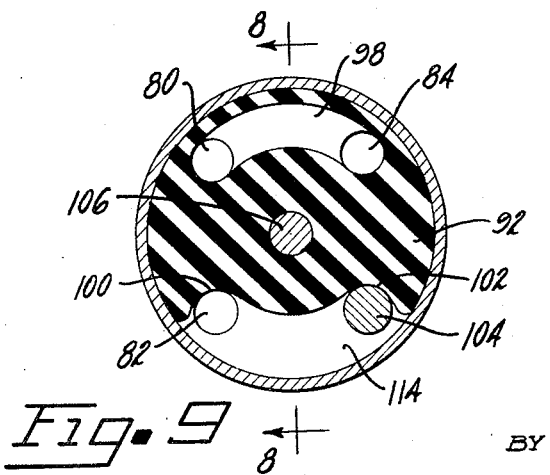
Figure 11:
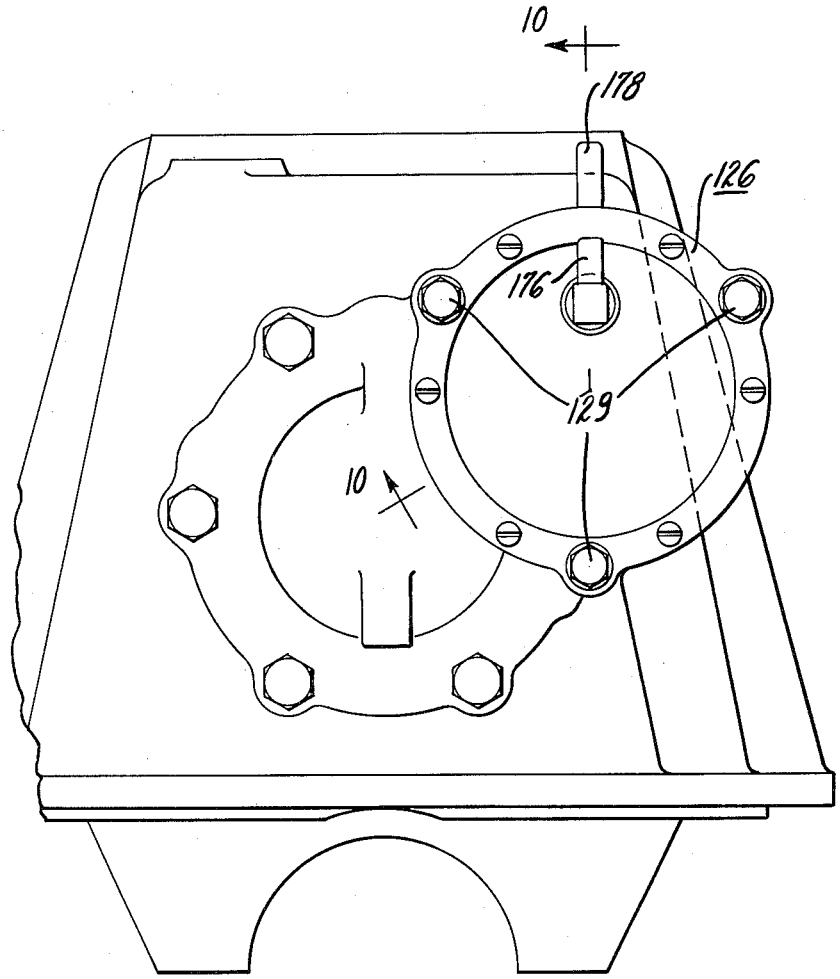

Figures 5, 6 and 7 disclose the aforementioned torsion spring and cranks in their three different operative positions;

Figure 8 is a sectional view of the double three-way selector valve of my invention, said view being taken on the line 8—8 of Figure 9;

Figure 9 is a sectional view of said valve taken on the line 9—9 of Figure 8;

Figure 10 is a sectional view, taken on the line 10—10 of Figure 11, of another embodiment of my invention this view disclosing a double-acting pressure differential operated motor mounted on the casing of a two-speed axle mechanism, the power element of said motor being connected to a shift fork of said axle mechanism by a double-acting yieldable means; and Figure 11 is an end view of the two-speed axle mechanism of Figure 10, together with an end view of the vacuum motor of my invention.

Figure 1:
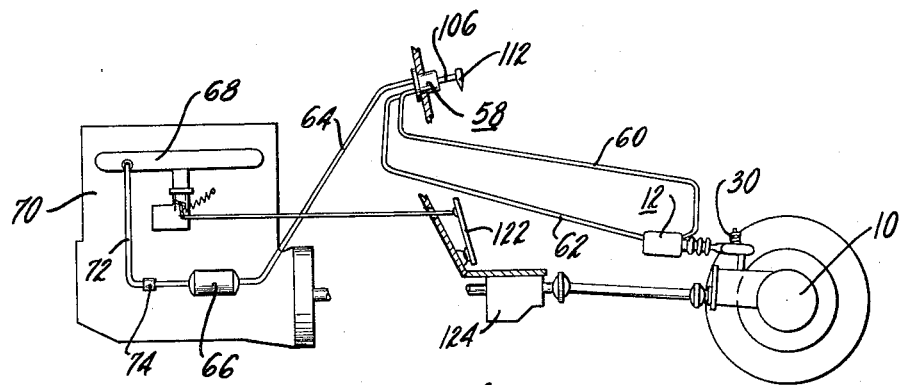
Figure 1 is a diagrammatic view disclosing the preferred embodiment of my invention serving to operate a so-called two-speed rear axle of an automotive vehicle.

Referring now to Figure 1 disclosing a preferred embodiment of my invention on a rear axle, generally indicated by the reference numeral 10, is of the two-speed type and the change from one axle speed to another is effected by means of a double-acting double-ended pressure differential operated motor 12 which may be secured to the chassis of the car or any other suitable mounting. It is to be understood however that my invention is not necessarily limited to means for operating a two-speed axle; for the double-acting motor 12 of my invention may also be used to operate any multi-speed transmission mechanism to establish one or the other of two settings thereof.

Figure 2:
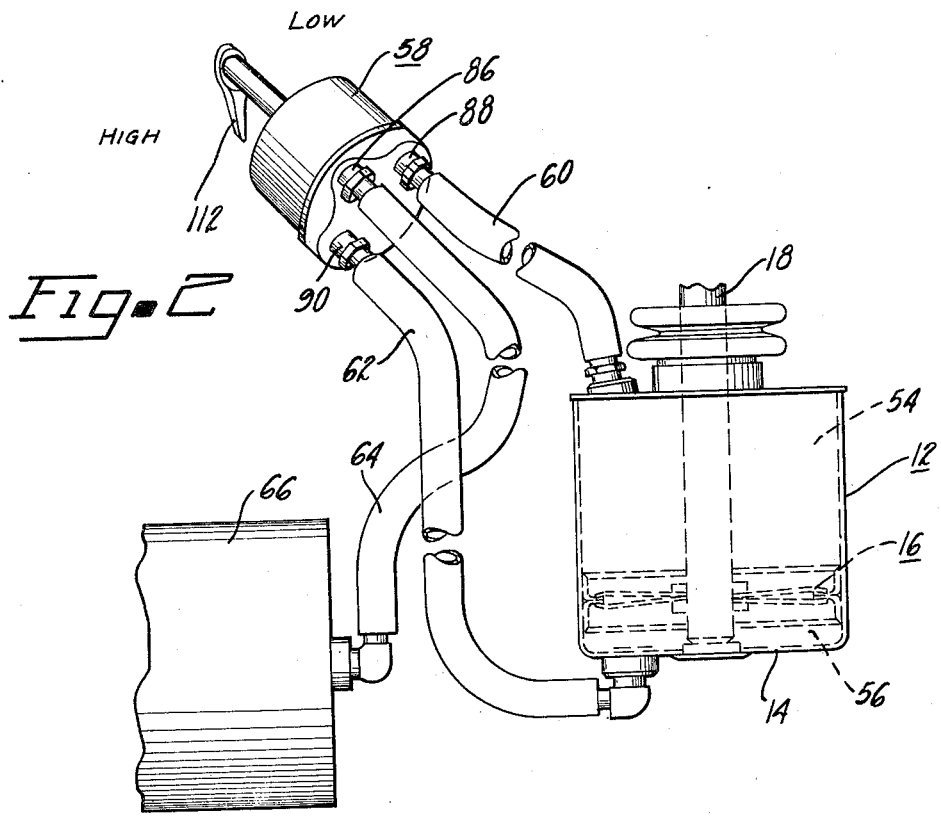
Figure 2 is a schematic view disclosing the principal elements of the transmission operating power means constituting my invention and disclosed in Figure 1.

The motor 12 comprises a double-ended casing 14, Figure 2, and a piston that is power element 16 the latter being connected to the axle mechanism by force transmitting means which constitutes an important feature of my invention. As disclosed in Figures 3 to 7 inclusive this force transmitting means includes a rod 18 fixedly connected to the piston of the motor and projecting through one end of said motor. As disclosed in Figure 3 this rod 18 is adjustably connected to a pin 20 which is pivotally connected at its bifurcated end to a crank 22. This crank is enlarged at one of its ends, said enlargement, indicated by the reference numeral 24, being somewhat heart shaped in outline. Another crank 26 is pivotally connected to the crank 22 by a pin 28 and a torsion spring 30, sleeved over said pin and interposed between one face of the crank 22 and a washer 32, is secured in place by a nut 34. A tab 36 extends from one end of the crank 26 said tab being contactable which one or the other of stops 38 and 40 mounted on and extending from the casing of the two-speed axle.

Ends 42 and 44 of the torsion spring 30 are spaced apart and extend downwardly; and between said ends or prongs there extends a pin 46 which is fixedly secured to and extends from the heart shaped end portion 24 of the crank 22. A pin 48, fixedly secured to and extending from the crank 26, extends through an arcuate slot in the aforementioned heart shaped end portion 24 of the crank 22; and this pin 48 also lies between the prongs 42 and 44. Completing the description of the force transmitting means interconnecting the power element of the motor 12 and the two-speed axle mechanism the crank 26 is detachably but non-rotatably mounted, by means including a nut 50, upon one end of a shaft 52 said shaft being connected at one of its ends to the transmission mechanism of the two-speed axle.

As disclosed in Figure 2 the two compartments 54 and 56 of the double-acting motor 12 are connected with a so-called double three-way selector valve 58 by conduits 60 and 62, and a conduit 64 interconnects said valve with a vacuum reservoir 66. This reservoir is connected with the intake manifold 68 of the internal combustion engine 70 of the vehicle by a conduit 72 and a check valve 74 is incorporated in said latter conduit to insure the evacuation of said reservoir by the operation of said engine. It is to be noted however that this vacuum reservoir 66 may be omitted from the transmission operating mechanism of my invention in which case the intake manifold of the engine is directly connected to the control valve 58 by a single conduit; the aforementioned check valve 74 is however included in the latter conduit.

Referring now to Figures 8 and 9 disclosing the details of the double-acting three-way selector valve 58 said valve consists of two members 76 and 78. The member 76, which is preferably of steel, is bored to provide three spaced openings 80, 82 and 84 and one end of each of said openings or bores is preferably threaded to receive a nipple, Figure 2. These nipples, which are indicated by the reference numerals 86, 88 and 90, extend through the instrument panel of the vehicle and constitutes means for mounting the control valve in position. As disclosed in Figure 2 the vacuum conduit 64 is connected to the nipple 86 and the nipples 88 and 90 are connected respectively to the aforementioned conduits 60 and 62. The remaining valve member 78 consists in the main of a half disk member 92, preferably of rubber or equivalent material, mounted on a relatively thin steel plate 94 of the same outline. The upper edge of the disk member 92 is provided with an arcuate recess 98 and the base portion of said valve member is shaped to provide two recesses 100 and 102 each of which is shaped to fit around a portion of a pin 104 fixedly mounted in and extending from the inner face of the valve member 76. The valve member 78, consisting of the members 92 and 94, is non-rotatably mounted upon a shaft member 106 which extends through the valve member 76; and said shaft member also extends through the instrument panel of the car and a cup-shaped cover member 108 which is friction fitted to and constitutes a cover or housing for both valve members. This cover member 108 also constitutes a housing for suitable air cleaner material such as steel wool 110. A crank 112, which may be termed a selector lever is non-rotatably mounted on the shaft 106 and serves as the means by which the driver rotates the valve member 58 to selectively energize the motor 12.

Briefly describing now the operation of the control valve 58 when the driver of the car wishes to establish the two-speed axle mechanism in its low gear setting he rotates the valve operating selector lever 112 clockwise to its low gear position indicated by the word "low" in Figure 2; and by this operation the valve member 78 is rotated clockwise, Figure 9, to complete the air transmitting connection between the vacuum tank 66 and the compartment 56 of the motor 12 by the conduit 64, nipple 86, opening 80 in the valve member 76, the recess 98 in the member 92, the opening 84 in the valve member 76, the nipple 90, and the conduit 62. This operation of the control valve also serves to vent the remaining motor compartment 54 to the atmosphere via the conduit 62, the nipple 90, the opening 82 in the valve member 76, a compartment 114 in the valve member 78, openings 116 in a plate 118 which maintains the steel wool in position, and openings 120 in the end wall of the cover member 108. In this operation of the control valve 58 the valve member 78 is rotated until the pin 104 registers with the recess 102, Figure 9, said pin therefore acting as a stop to insure a registering of the recess 98 with the openings 80 and 84.

Now inasmuch as by this operation the compartments 56 and 54 of the motor are partially evacuated and vented to the atmosphere respectively it follows that the piston 16 of said motor is then subjected to a differential of pressures resulting in a movement of the same to position disclosed in Figure 2 to establish the rear axle in its low gear setting. This operation, including the operation of the torsion spring 30 and the control of the torque, of the engine to facilitate the operation of the motor, will be described in detail hereinafter.

The operation of the valve 58 to effect a low gear operation of the motor 12 having been described in detail it follows that it is unnecessary to describe in detail the high gear operation of said valve and motor; for the latter operations are, of course, just the reverse so to speak of the above described low gear operation. In this high gear operation of the mechanism the lever 112 is moved counter-clockwise to its high gear position thereby rotating the valve member 78, Figure 9, to register the stop pin 104 in the recess 100. The compartments 54 and 56 are then connected respectively to the source of vacuum and to the atmosphere whereupon the motor is energized to establish the two-speed axle in its high gear setting.

Describing now the complete operation of the mechanism constituting my invention of which the accelerator 122 of the vehicle constitutes a part, it will be assumed that the vehicle is at a standstill with the engine idling and that the two-speed axle mechanism is established in its low gear setting. The piston 16 of the motor 12 is then in the position disclosed in Figure 2. Incidentally the multi-speed transmission 124, Figure 1, which constitutes a part of the power plant of most vehicles of the day, is at this time probably established in a relatively low gear ratio setting.

The driver of the vehicle will then depress the accelerator and engage the friction clutch to get the vehicle under way however if the power plant includes a fluid coupling, then an operation of the friction clutch may be dispensed with. Now when the desired vehicle speed is reached in the low gear setting of the two-speed axle the driver will effect the high gear setting of said axle by releasing the accelerator and moving the selector lever 112 to its high gear setting. The compartments 54 and 56 of the motor 12 are then connected to the source of vacuum and the atmosphere respectively whereupon said motor is energized. Now one of the important features of my invention should be described at this juncture; that is the operation of the force transmitting means interconnecting the motor 12 with the two-speed axle and operation of said force transmitting means in conjunction with an operation of the internal combustion engine which drives the driving gear member of the axle mechanism. Continuing now the description of the operation of establishing the two-speed axle mechanism in its high gear setting, which description brings out this important feature of my invention, when the motor 12 is energized the first half or approximately the first half of the movement of the piston 16 will serve to compress or cock the torsion spring 30; and this operation is effected by virtue of the fact that said spring is of such a strength as to compress before the gears of the two-speed axle are demeshed. This operation is effected despite the release of the accelerator to reverse the torque of the engine and lighten the load upon the driving gear of the axle mechanism. With this spring compressing operation the cranks 22 and 26 assume the relative positions disclosed in Figure 5, the tab 36 remaining in contact with the stop 38. The piston 16 of course continues its movement toward its high gear position after the spring 30 is cocked and this movement, that is the last half of the piston movement, results in a demeshing of the gears of the axle mechanism to neutralize said mechanism. The cranks 22 and 26 then assume the relative positions disclosed in Figure 6, the tab 36 being located half way or approximately half way between the stops 38 and 40. In this operation the piston 16 bottoms in the cylinder 14 that is said piston moves until it abuts an end wall of the cylinder casing.

Now when the speed of the gears to be meshed become equal or substantially so, that is when the same are synchronized by the slowing down of the driving gear of the axle mechanism, then said gears are meshed to establish the axle mechanism in its high gear setting; and with this operation the cranks 22 and 26 assume the relative positions disclosed in Figure 7 the tab 36 moving into contact with the stop 40. This gear meshing operation is of course effected by the expansion of the torsion spring 30. The axle mechanism having been established in its high gear setting by operating the control valve 58 and releasing the accelerator the driver will then depress the accelerator to either maintain the existing speed of the vehicle or increase the speed as desired.

When the driver desires to establish the axle mechanism in its low gear setting for example when he desires to quickly pass a car on the road or maintain the car speed when climbing a hill, he moves the selector lever to its low gear position marked "low" in Figure 2 and then successively fully releases and then after a short period of time depresses the accelerator. Describing this operation when the selector lever is moved to its low gear position and the accelerator is released to reverse the engine torque and create a source of vacuum in the intake manifold, then the motor 12 is again energized and the aforementioned operation of the force transmitting means interconnecting the piston 16 and the axle mechanism is repeated. The first half of the movement of the piston cocks the spring 30 and the last half of said movement serves to neutralize the axle mechanism, both of these operations, as with the above described high gear operation of the motor, being effected before the gears of the axle mechanism are brought to synchronous speeds and while the accelerator is in its released position to reverse the engine torque. This gear synchronizing operation is effected by depressing the accelerator thereby speeding up the engine and the driving gear of the axle mechanism connected thereto. When the driving gear reaches its so-called synchronous speed then the gears of the axle mechanism are meshed and said mechanism is established in its low gear setting; and as with the above described high gear operation of the axle mechanism this operation is effected by the expansion of the torsion spring 30, the cranks 22 and 26 again assuming the relative positions disclosed in Figure 5 the tab 36 contacting the stop 38.

There is thus provided, by the transmission operating mechanism disclosed in Figures 1 to 9 inclusive, a very simple, effective and easily serviced mechanism. With this transmission operating mechanism there are but two controls to be operated by the driver that is the accelerator of the car and the selector valve 58. The vacuum storage tank 66 may of course be omitted from the mechanism disclosed in Figure 1 however to make the mechanism absolutely fool proof it is best to leave said tank in the system; for said tank would be necessary in the system if the driver carelessly released the accelerator then immediately depressed the same to destroy the vacuum in the intake manifold before the operations of cocking the spring and neutralizing the transmission had been completed.

There is disclosed in Figures 10 and 11 another embodiment of my invention wherein a double-acting pressure differential operated motor 126 is directly mounted on the casing of the two-speed axle mechanism. As disclosed in Figure 10 the motor 126 comprises a cup-shaped casing member 128 detachably secured, by bolts 129, to a disk-like member 130 projecting from a cap portion 132 of the axle housing and to a motor casing member 134 the central portion of which projects inwardly to form a tubular member 136. The bolts 129 also extend through a flange 138 extending from a portion 140 of the casing of the axle housing. The power element, that is the piston 142 of the motor 126 is mounted upon a connecting rod 144 extending within the aforementioned tubular portion 136 of the motor casing. The two-speed axle mechanism, not shown, is actuated to establish said mechanism in one or the other of its two gear ratio settings, by a shift fork 146 which is reciprocated back and forth between stops 148 and 150 by the operation of the motor 126. One end of the shift fork is chamfered at 152 and 154 on its end faces to provide cam surfaces which move into contact with the tapered ends of the stops 148 and 150 and this construction provides a means for limiting the degree of shift movement of the fork.

Describing now the connection between the shift fork 146 and the piston 142 a tubular member 156 is fixedly secured to the end or hub portion of said fork and a tubular member 158, fixedly secured to the member 156, is reciprocably mounted within bearings 160 and 162 mounted within recesses in the tubular member 136. Thrust members 164 and 166, sleeved over the rod 144 between snap rings 168 and 170, are spaced apart by a compression spring 172. The thrust member 166 is forced by the spring 172 into abutment with one end face of the member 156 and the thrust member 164 is forced, that is biased by the spring 172 into abutment with the snap ring 168 embedded within the member 158. The snap rings 168 and 170 are embedded within the rod 144.

Conduits 176 and 178, Figure 10, each connected with one of the two compartments of the motor 126, are connected with a double three-way control valve duplicating the control valve disclosed in Figures 8 and 9 and which has been described in detail above.

As to the operation of the axle operating power means disclosed in Figures 10 and 11 the same need not be described in detail inasmuch as said operation duplicates the operation of the mechanism disclosed in Figure 1 which operation has been described in detail above. Suffice it to say that in effecting a low gear setting of the axle mechanism the piston 142 first moves from a position in contact with a stop 180 secured to the casing member 134 to a position midway between said stop and a stop 182 secured to the casing member 128. The spring 172 is compressed or cocked during this piston movement. The second half of movement of the piston 142 then effects the denmeshing that is transmission neutralizing operation of the axle mechanism said piston moving to the position disclosed in Figure 10, that is against the stop 182. The shift fork 146 is by this operation moved to a position midway between the stops 148 and 150. The final, that is gear meshing movement of the shift fork is effected by the expansion of the spring 172 said fork moving into contact with the stop 148 as disclosed in Figure 10. As to the movement of the parts of the shifter mechanism from their low gear positions disclosed in Figure 10 to their high gear positions this operation of the mechanism need not be described inasmuch as it is merely the reverse of the low gear operation of the mechanism just described.

It is thought that the invention and many of its attendant advantages will be understood from the foregoing description and though said invention has been described in connection with a preferred embodiment and a modification thereof it will be apparent that various changes may be made in the form, construction, and arrangement of parts without departing from the spirit and scope of the invention or sacrificing all of its material advantages, the forms hereinbefore described being merely certain embodiments.

I claim:

1. In an automotive vehicle provided with a multi-speed rear axle including a casing member and a reciprocable shift fork; means for operating said multi-speed rear axle to establish the same in either a high gear setting or a low gear setting, power means for moving said multi-speed axle operating means in one or the other of two directions to effect the aforementioned operation of the rear axle mechanism said power means comprising a double-acting double-ended vacuum operated motor comprising two casing parts each part provided with an outwardly extending flange said flanges being secured together and to a part of the aforementioned casing of the multi-speed rear axle, said motor further comprising a reciprocable power element, force transmitting means interconnecting said power element with the aforementioned reciprocable shift fork said force transmitting means including a hollow rod secured to the shift fork, a rod secured to the power element and housed within said hollow rod and means including yieldable means interposed between and constituting the connection between said rods, said power means further including a selector valve for controlling the operation of said motor.

2. In an automotive vehicle provided with a power plant including an internal combustion engine, an accelerator for in part controlling the operation of said engine and a change-speed transmission; means for operating the said transmission to establish the same in either a high gear setting or a low gear setting, power means, operative in three distinct stages, for moving said transmission operating means in one direction or the other of two directions to effect the aforementioned operation of the transmission said power means comprising a double-acting pressure differential operated motor including a cylinder and a power element, force transmitting means, including a torsion spring of a certain strength, interconnecting said power element with the aforementioned transmission operating means, and a double three-way selector valve for controlling the operation of said motor; the parts of said power means being so constructed and arranged, and so operative in conjunction with an operation of the internal combustion engine, that to effect the low gear setting of the transmission the driver places the valve in one of its settings and releases the accelerator whereupon said motor is energized the first half of the movement of the power element of said motor, that is the first stage of operation of the power means, serving to cock said torsion spring and the second half of the movement of said power element, that is the second stage of operation of the power means, serving to neutralize the transmission, the cocked torsion spring being then operative by its expansion, and after the accelerator is depressed to speed the engine to bring the driving gear of the transmission up to synchronous speed, to effect a low gear setting of the transmission said operation of the spring constituting the third and final stage of operation of the power means.

EARL R. PRICE.